Oct. 2, 1928.  
O. WEBERG  
1,686,052
DETACHABLE ANTISKID TREAD
Filed Dec. 7, 1925
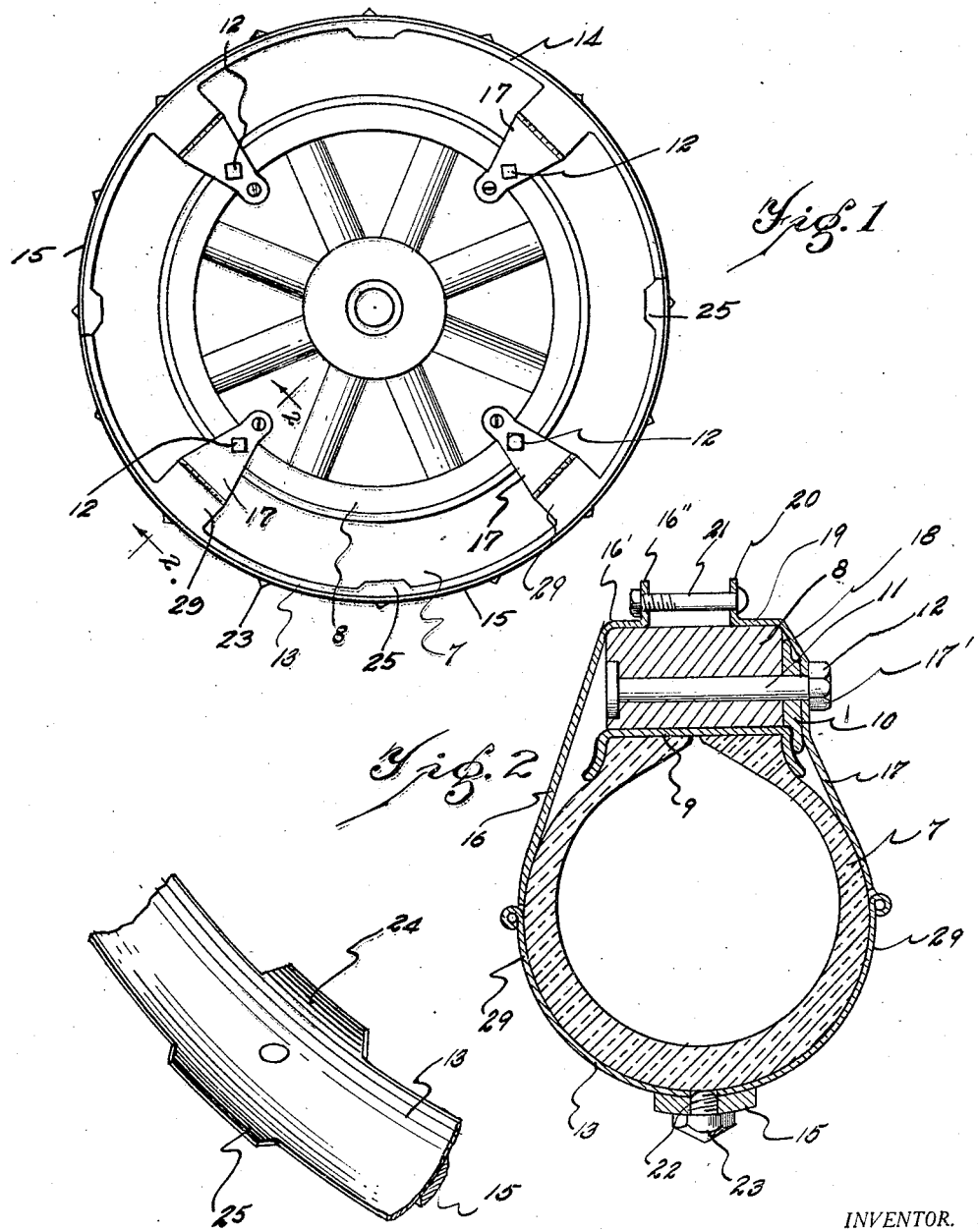
INVENTOR.
OLAF WEBERG
BY
Thos S Donnelly
ATTORNEY Patented Oct. 2, 1928.

1,686,052

UNITED STATES PATENT OFFICE.

OLAF WEBERG, OF DEARBORN, MICHIGAN.

DETACHABLE ANTISKID TREAD.

Application filed December 7, 1925. Serial No. 73,644.

My invention relates to a new and useful improvement in a detachable anti-skid tread adapted for mounting on vehicle tires and the like to provide means for gripping the surface over which the tire is driven and to prevent a lateral slipping of the tire on the surface.

The object of the present invention is to provide an anti-skid tread of this class which may be easily and quickly attached to a vehicle wheel bearing a tire.

Another object of the invention is the provision of an anti-skid tread of this class which may be so mounted upon the wheel as to prevent creeping of the same about the tire on which mounted.

Another object of the invention is the provision of an anti-skid tread of this class having detachable gripping members so that they may be removed and replaced when worn thus lending a long life to the device.

Other objects will appear hereinafter.

The invention consists in the combination and arrangement of parts hereinafter described and claimed.

The invention will be best understood from a reference to the accompanying drawings, which form a part of this specification and in which, Fig. 1 is a side elevational view of a wheel showing the invention applied.

Fig. 2 is a sectional view taken on substantially line 2—2 of Fig. 1.

Fig. 3 is a fragmentary perspective view of the tread portion.

As shown in the drawings, the invention is for use with a vehicle wheel having a tire 7 mounted upon the usual rim 9 which is positioned about the felly 8.

As shown in Fig. 2 the rim engaging lugs 10 are secured to the felly by the bolt 11 upon which is threaded the nut 12. The detachable tread in which the invention consists comprises a pair of trough-shaped sections 13 and 14 which are positioned about the periphery of the tire 7 so as to form a covering for the tread portion thereof. It is apparent that as many of these sections 13 and 14 may be used as desired in order to extend around the periphery of the tire although, as shown in the drawings I prefer to construct the device from two sections. Extending longitudinally over each section 13 and 14 centrally thereof and secured thereto in any suitable manner such as by welding or the like are reinforcing bars 15. Formed on the members 13 and 14 at spaced intervals are lugs 29 pivotally connected to which are retaining clips 16 and 17. The clip 16 is angularly turned at 16' to lie in engagement with the inner surface of the felly. This angularly turned portion being again angularly turned to provide the inwardly extending portion 16''. The end of the member 17 is also angularly turned as at 18 and 19—the angularly turned portion being again angularly turned to provide the inwardly projecting portion 20, so that the inner surface of the felly is embraced by the end of the clip 17. A suitable bolt 21 is projected through the inwardly projecting angularly turned portion 16'' and 20 to bind the device upon the felly.

The member 17 is provided with an opening 17' for the reception of the bolt 11 so that the device is prevented from creeping about the tire when in use.

Gripping members are provided each having a threaded stem 22 which is threaded into the reinforcing bar 15 and the sections 13 and 14. Each of these stems 22 is provided with a pointed head 23 to form a gripping member for gripping the surface over which the wheel is passed. It is evident that these gripping members are detachable and that they may be removed and replaced when worn. It is also evident that they will on account of being projected beyond the outer surface of the reinforcing bars 15 be the only parts of the device which are directly subjected to wear on account of contact with the surface over which the wheel may be passing, so that by renewal of the grippng members 23 the life of the device may be prolonged, considerably. Projecting outwardly from opposite sides of the sections 13 and 14 are flaps 24 and 25 which serve to engage a larger portion of the tire 7 than does the main body of the sections 13 and 14—these flaps serving a larger bearing surface and assuring a more snug engagement of the device with the periphery of the tire.

It is believed obvious that in mounting the device it is positioned about the tire and the bolts 21 project through the portions 20 and 16''.

While I have illustrated and described the preferred form of structure, I do not wish to limit myself to the precise form of structure shown, but desire to avail myself of such variations and modifications as come within the scope of the appended claim.

Having thus described my invention what I claim as new and desire to secure by Letters Patent is:

A device of the class described adapted for use with a vehicle wheel having a felly, bolts projected therethrough and a tire carried by said felly, comprising: a plurality of sections positioned on the tread portion of said tire and extending circumferentially thereof; oppositely disposed co-operating attachment lips swingably mounted on said sections, the clips on one side of said felly being formed to lie in engagement with the side face of said felly and provided with openings for accomodating the bolts projected through said felly, each of said clips being angularly turned at its free end for engaging the inner surface of said felly; and a bolt projected through the free ends of said clips for clamping the same in engagement with said felly.

In testimony whereof, I have signed the foregoing.

OLAF WEBERG.